United States Patent
Ren et al.

(10) Patent No.: US 9,303,697 B2
(45) Date of Patent: Apr. 5, 2016

(54) DRIVING SYSTEM AND ELECTRIC VEHICLE COMPRISING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Yi Ren, Shenzhen (CN); Guangquan Chen, Shenzhen (CN); Kaizhao Li, Shenzhen (CN); Daqi Chen, Shenzhen (CN); Hengjun Zhai, Shenzhen (CN); Shuanghong Jing, Shenzhen (CN); Xin Wen, Shenzhen (CN)

(73) Assignees: SHENZHEN BYD AUTO R&D COMPANY, Guangdong (CN); BYD COMPANY LIMITED, Shenzhen, Guangdong (CN)

( * ) Notice: Subject to any disclaimer, the term of this patent is extended or adjusted under 35 U.S.C. 154(b) by 26 days.

(21) Appl. No.: 14/369,859

(22) PCT Filed: Dec. 28, 2012

(86) PCT No.: PCT/CN2012/087918
§ 371 (c)(1),
(2) Date: Jun. 30, 2014

(87) PCT Pub. No.: WO2013/097784
PCT Pub. Date: Jul. 4, 2013

(65) Prior Publication Data
US 2015/0001031 A1    Jan. 1, 2015

(30) Foreign Application Priority Data
Dec. 30, 2011    (CN) ...................... 2011 2 0563824 U

(51) Int. Cl.
*F16H 3/08* (2006.01)
*F16D 25/10* (2006.01)
(Continued)

(52) U.S. Cl.
CPC ............... *F16D 25/06* (2013.01); *B60K 17/02* (2013.01); *F16H 3/006* (2013.01);
(Continued)

(58) Field of Classification Search
CPC ...................................................... F16D 25/06
See application file for complete search history.

(56) References Cited

U.S. PATENT DOCUMENTS 5,827,148 A    10/1998  Seto et al.
2012/0073394 A1*  3/2012  Ren et al. ................... 74/325
(Continued)

FOREIGN PATENT DOCUMENTS

CN    101204925 A    6/2008
CN    101204925 A    6/2008
(Continued)

OTHER PUBLICATIONS

Raw translation of CN 101204926, Yi Ren, Electric Motor Vehicle Driving system, Jun. 25, 2008, 19 pages.*
Shenzhen BYD Auto R&D Company Limited, International Search Report, PCT/CN2012/087918, Apr. 4, 2013, 5 pgs.
Shenzhen BYD Auto R&D Company Limited, et al., Communication Pursuant to Article 94(3) EPC, EP12863834.3, Jul. 31, 2015, 6 pgs.

*Primary Examiner* — Ramya Burgess
*Assistant Examiner* — Lillian Nguyen
(74) *Attorney, Agent, or Firm* — Morgan, Lewis & Bockius LLP

(57) ABSTRACT

A driving system of an electric vehicle and an electric vehicle comprising the same are provided. The driving system comprises: a driving motor, a transmission and a hydraulic system. The transmission may include an input shaft, an output shaft, a first transmission unit, a first clutch, a second transmission unit and a second clutch.

14 Claims, 2 Drawing Sheets

(51) Int. Cl.
  *F16D 25/06* (2006.01)
  *F16H 61/02* (2006.01)
  *F16H 61/688* (2006.01)
  *F16H 3/00* (2006.01)
  *F16H 61/00* (2006.01)
  *B60K 17/02* (2006.01)
  *F16H 3/089* (2006.01)
  *B60K 1/00* (2006.01)
  *F16H 61/06* (2006.01)

(52) U.S. Cl.
  CPC ....... *F16H 61/0031* (2013.01); *F16H 61/0206* (2013.01); *F16H 61/688* (2013.01); *B60K 2001/001* (2013.01); *F16H 3/089* (2013.01); *F16H 61/067* (2013.01); *F16H 2200/0034* (2013.01)

(56) References Cited

U.S. PATENT DOCUMENTS

2012/0144946 A1\* 6/2012 Lundberg et al. .......... 74/473.11
2013/0180358 A1\* 7/2013 Ren et al. .................... 74/730.1

FOREIGN PATENT DOCUMENTS

| CN | 101204926 A  | 6/2008  |
|----|--------------|---------|
| CN | 201800540 U  | 4/2011  |
| CN | 201800540 U  | 4/2011  |
| CN | 102416862 A  | 4/2012  |
| CN | 102416862 A  | 4/2012  |
| CN | 202429065 U  | 9/2012  |
| CN | 202431628 U  | 9/2012  |
| CN | 202431628 U  | 9/2012  |
| JP | 2007261491 A | 10/2007 |

\* cited by examiner

DRIVING SYSTEM AND ELECTRIC VEHICLE COMPRISING THE SAME

CROSS REFERENCE TO RELATED APPLICATIONS

This application is a United States National Stage Application filed under 35 U.S.C. §371 of PCT Patent Application Serial No. PCT/CN2012/087918 filed on Dec. 28, 2012, which claims priority to and benefits of Chinese Patent Application Serial No. 201120563824.1, filed on Dec. 30, 2011, the entire contents of which are incorporated herein by reference.

FIELD

The present disclosure relates to the vehicle field, more particularly to a driving system for an electric vehicle and an electric vehicle comprising the same.

BACKGROUND

The electric vehicle has been developed rapidly. The electric vehicle employs a power battery as the power source thereof and is driven by an electric motor, thus avoiding limitation of the engine and reducing the environmental pollution.

Conventionally, the electric vehicle may be driven by a driving motor and a reducer with a constant transmission ratio. It is well known that the output torque of the driving motor is large and the efficiency is low at a low speed. With the increasing of the speed, the efficiency of the driving motor is increased gradually, but the output torque is decreased.

With the electric vehicle comprising the reducer with a constant transmission ratio, if the reducer is designed to have a large output torque, the efficiency is increased slowly with the increasing of the speed of the driving motor, and consequently the power consumption of the vehicle is high at a high speed. If the reducer is designed to have a high speed, the efficiency is increased fast with the increasing of the speed of the driving motor. However, since the transmission ratio of the reducer is low, the torque transmitted to the wheels is too low to satisfy the requirement of starting or climbing of the vehicle. As a result, the acceleration ability of the vehicle is poor and the power consumption is high at a low speed of the vehicle. For example, the electric bus may need to frequently stop, start or accelerate, which may cause the efficiency of the driving motor low. Therefore, the driving system of the conventional electric vehicle is difficult to meet the work conditions at both low and high speeds simultaneously, so that the efficiency of the driving motor is low, which may decrease the cruising range of the electric vehicle. As a result, the conventional electric vehicle may not be suitable for the complicated road conditions.

SUMMARY

In viewing thereof, the present disclosure is directed to solve at least one of the problems existing in the prior art. Accordingly, a driving system of an electric vehicle may be provided, which may match the torque and speed characteristics of the driving motor appropriately to effectively improve the efficiency of the driving motor under various conditions. Further, an electric vehicle comprising the same may also be provided.

According to an aspect of the present disclosure, a driving system of an electric vehicle may be provided. The driving system may comprise: a driving motor and a transmission. The transmission may include an input shaft, an output shaft, a first transmission unit, a first clutch, a second transmission unit and a second clutch, and a hydraulic system. The input shaft may be connected to the driving motor. The first transmission unit may have a first transmission ratio and be connected to the input shaft and the output shaft, respectively, to transmit power therebetween. The first clutch may be disposed on the input shaft and connected to the first transmission unit, for connecting and disconnecting power transmission between the input shaft and the first transmission unit. The second transmission unit may have a second transmission ratio smaller than the first transmission ratio and connected to the input shaft and the output shaft, respectively, to transmit power therebetween. The second clutch may be disposed on the input shaft and connected to the second transmission unit, for connecting and disconnecting power transmission between the input shaft and the second transmission unit. The hydraulic system may be connected to the first clutch to engage and disengage the first clutch and be connected to the second clutch to engage and disengage the second clutch respectively.

According to another aspect of the present disclosure, an electric vehicle may be provided. The electric vehicle may comprise a driving system as described above.

With the driving system and an electric vehicle of the present disclosure, the torque and speed characteristics of the driving motor may be appropriately matched with each other, thus the efficiencies of the driving motor under different driving conditions may be effectively improved.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Embodiments of the present disclosure will be described in detail in the following descriptions. It is to be understood that the embodiments described herein are merely used to generally understand the present disclosure, but shall not be construed to limit the present disclosure.

In the description, it should be understood that, the terms "first" and "second" are only used for description and can not be construed to explicitly or implicitly refer to the relative importance or implicitly indicate the quality of technical features. Thus, the features defined by "first" and "second" may explicitly or implicitly comprise one or more features. In the description, unless otherwise indicated, the term "a plurality of" means two or more.

In the description as described hereinafter, it should be understood that, terms concerning attachments, coupling and the like, such as "connected", refer to a relationship in which structures are secured or attached to one another either directly or indirectly through intervening structures, or structures are coupled to each other, unless expressly described otherwise.

A driving system of an electric vehicle according to embodiments of the present disclosure will be described with reference to FIGS. 1-2.

Figure 1:
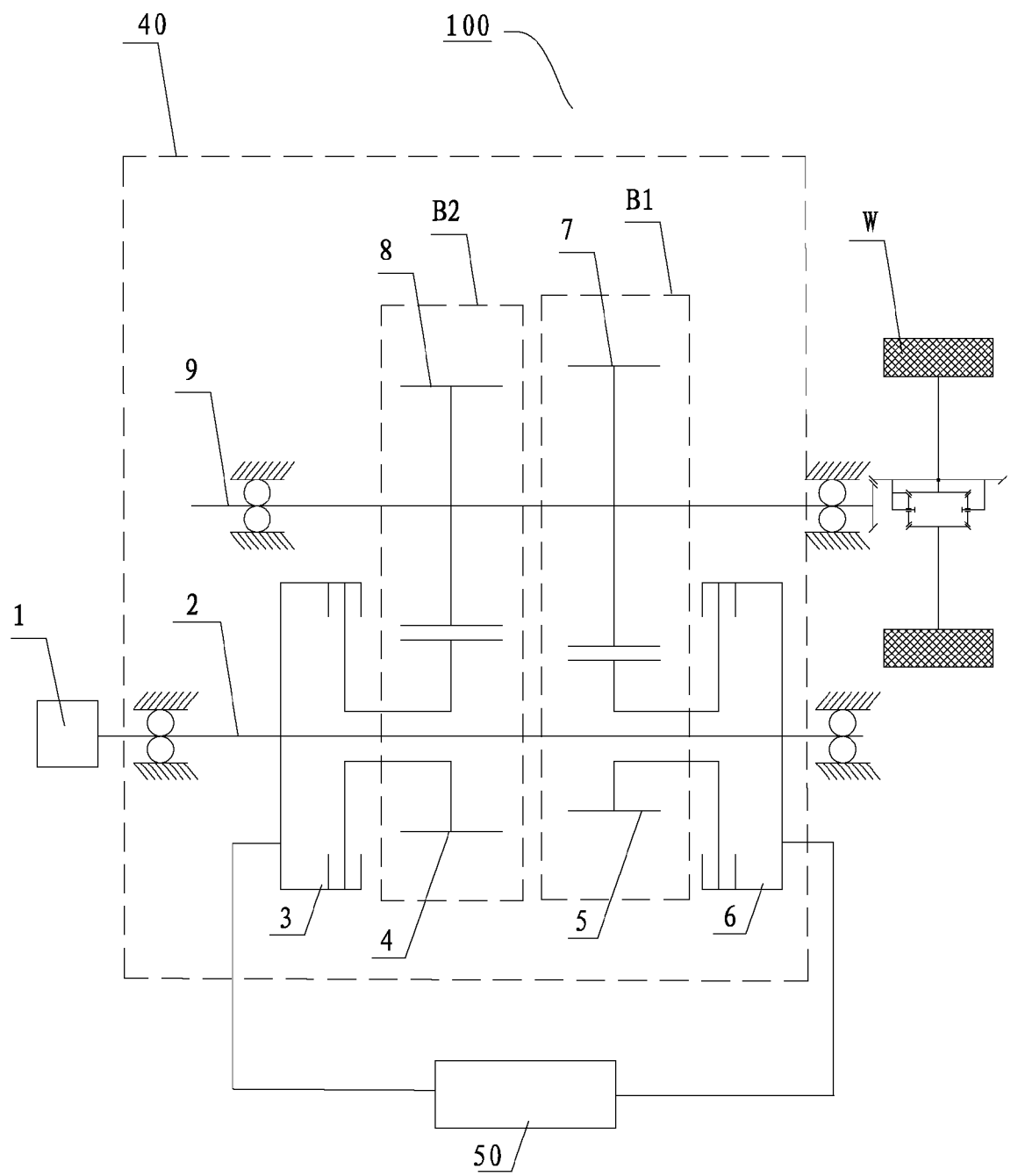
FIG. 1 is a schematic view illustrating a driving system of an electric vehicle according to an embodiment of the present disclosure.

As shown in FIG. 1, the driving system 100 of the electric vehicle comprises a driving motor 1, a transmission 40 and a hydraulic system 50.

Particularly, the transmission 40 may include an input shaft 2, an output shaft 9, a first transmission unit B1, a first clutch 6, a second transmission unit B2 and a second clutch 3. The driving motor 1 may be coupled to the input shaft 2 to drive the input shaft 2 to rotate.

In some embodiments of the present disclosure, the driving motor 1 may be connected or coupled to the input shaft 2 via a spline. However, the present disclosure is not limited to this. In some embodiments, the driving motor 1 may be directly coupled to the input shaft 2 by other means.

According to embodiments of the present disclosure, the driving motor 1 is directly coupled to the input shaft 2 without clutches and torque converters disposed therebetween, which is different from the conventional vehicle employing an engine, thus improving the power transmission efficiency and simplifying the structure thereof.

The first transmission unit B1 may be connected to the input shaft 2 and the output shaft 9, respectively, to transmit power therebetween. The second transmission unit B2 may be connected to the input shaft 2 and the output shaft 9, respectively, to transmit power therebetween.

The first clutch 6 may be disposed on the input shaft 2 and connected to the first transmission unit B1, for connecting and disconnecting the power transmission between the input shaft 2 and the first transmission unit B1. In other words, the first clutch 6 may be configured to connect and disconnect the power transmission between the input shaft 2 and the output shaft 9.

The second clutch 3 may be disposed on the input shaft 2 and connected to the second transmission unit B2, for connecting and disconnecting power transmission between the input shaft 2 and the second transmission unit B2. In other words, the second clutch 3 may be configured to connect and disconnect the power transmission between the input shaft 2 and the output shaft 9. The first transmission unit B1 may have a first transmission ratio. The second transmission unit B2 may have a second transmission ratio smaller than the first transmission ratio.

The hydraulic system 50 may be connected to the first clutch 6 to engage and disengage the first clutch 6 and connected to the second clutch 3 to engage and disengage the second clutch 3.

With the driving system of the electric vehicle according to embodiments of the present disclosure, the transmission may have the first transmission unit B1 and the second transmission unit B2, and the first transmission ratio of the first transmission unit B1 may be larger than the second transmission ratio of the second transmission unit B2, so that the torque and speed characteristics of the driving motor can be appropriately matched to effectively improve the efficiencies of the driving motor under different driving conditions. Therefore, the energy may be saved, the cruising range of vehicles may be increased, and the structure of the driving system may be simplified.

More particularly, when the running speed of the electric vehicle is low, for example, when the electric vehicle starts, climbs or accelerates, the required output torque may be large, so that the hydraulic system 50 may engage the first clutch 6. In other words, the vehicle is switched to a first forward gear, the power from the driving motor 1 may be transmitted to the input shaft 2, then the power may be transmitted from the input shaft 2 to the output shaft 9 via the first clutch 6 and the first transmission unit B1, and finally the power may be transmitted to the wheels W of the electric vehicle. Because the first transmission unit B1 has a larger transmission ratio, the torque transmitted to the wheels W is larger, thus meeting the requirement for high output torque at the low speed.

When the speed of the electric vehicle is increased, the required output torque may be low, so that the hydraulic system may disengage the first clutch 6 and engage the second clutch 3. In other words, when the vehicle is switched to a second forward gear, the power may be transmitted from the input shaft 2 to the output shaft 9 via the second clutch 3 and the first transmission unit B2. Because the second transmission unit B2 has a smaller transmission ratio, the torque transmitted to the wheels W of the vehicle may be decreased and the rotational speed of the wheels W may be increased, thus meeting the requirements for the low output torque and the large output rotational speed.

When the vehicle needs to be reversed or backed, the driving motor 1 may reversely rotate, and the hydraulic system 50 may disengage the second clutch 3 and engage the first clutch 6. In other words, when the vehicle is switched to the reverse gear, the power is transmitted to the wheels W via the first clutch 6 and the first transmission unit B1. Because the vehicle may need a large output torque to revers, it is advantageous to engage the first clutch 6 so as to transmit the power via the first transmission unit B1 having the larger transmission ratio.

As described above, by selecting transmission units suitably, the torque and speed characteristics of the driving motor 1 may be appropriately matched so as to effectively improve the efficiencies of the driving motor under different driving conditions, thus saving the energy and increasing the cruising range of the electric vehicle. Therefore, the electric vehicle may have characteristics similar to those of the conventional vehicle employing an engine.

As described hereinabove, the driving system of the electric vehicle according to embodiments of the present disclosure may have the first transmission unit B1 and the second transmission unit B2, in other words, the vehicle may have two forward gears and one reverse gear. It should be understood that the present disclosure is not limited to this. In some embodiments, the driving system may have any suitable number of transmission units, such as three or four transmission units.

As shown in FIG. 1, in some embodiments, the first transmission unit B1 may comprise a first gear 5 disposed on the input shaft 2, and a second gear 7 disposed on the output shaft 9 and meshed with the first gear 5. The first gear 5 and the second gear 7 may be configured as cylindrical gears. Therefore, the structure of the first transmission unit B1 is simple. The first gear 5 may be rotatably engaged with the input shaft 2, and the second gear 7 is fixed onto the output shaft 9. A driving part of the first clutch 6 may be fixed onto the input shaft 2, and a driven part of the first clutch 6 may be connected to the first gear 5.

The second transmission unit B2 may comprise a third gear 4 disposed on the input shaft 2, and a fourth gear 8 disposed on the output shaft 9 and meshed with the third gear 4. The third gear 4 may be rotatably engaged with the input shaft 2, and the fourth gear 8 may be fixed onto the output shaft 9. A driving part of the second clutch 3 may be fixed onto the input shaft 2, and a driven part of the second clutch 3 may be connected to the third gear 4.

The hydraulic system 50 of the driving system will be described in detail with reference to FIG. 2.

Figure 2:
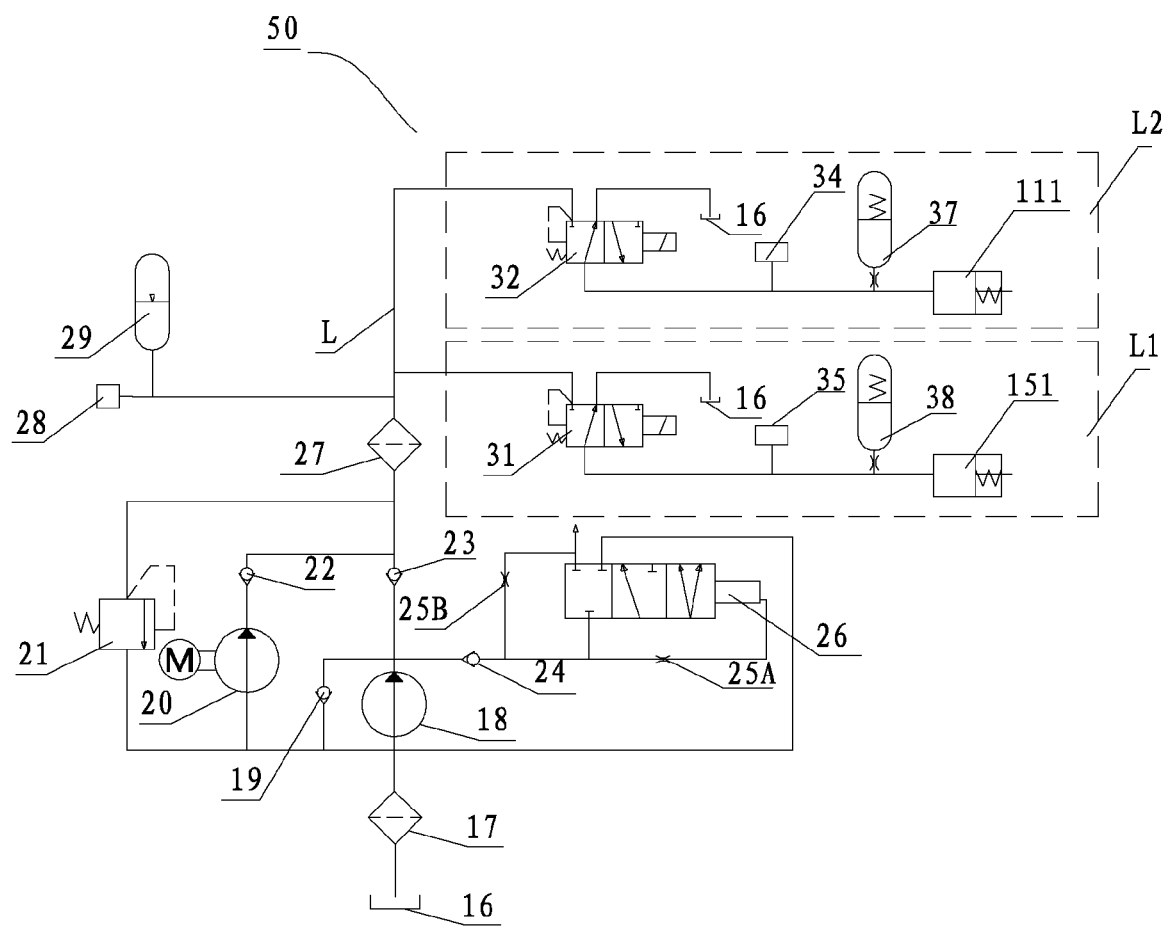
FIG. 2 is a schematic view illustrating a hydraulic system of an electric vehicle according to an embodiment of the present disclosure.

As shown in FIG. 2, the hydraulic system 50 comprises an oil container 16, a first clutch driving circuit L1 for driving the first clutch 6, a second clutch driving circuit L2 for driving the second clutch 3, an internal pump 18, a first check valve 23 connected in series to the outlet of the internal pump 18, an external pump 20, and a second check valve 22 connected in series with the outlet of the external pump 20.

It can be understood that when the number of the transmission unit is increased, the number of the clutch driving circuit may be increased correspondingly.

As shown in FIG. 2, the first clutch driving circuit L1 and the second clutch driving circuit L2 may be connected in parallel.

In some embodiments, as shown in FIG. 2, the first clutch driving circuit L1 comprises a first driving cylinder 151 and a first proportional valve 31. For example, the first proportional valve 31 may be a two-position three-way solenoid valve. In some embodiments, the first clutch driving circuit L1 may further comprise a first buffer 38 connected to the first proportional valve 31 and the first driving hydraulic cylinder 151, respectively. Alternatively, a first oil pressure sensor 35 for detecting an oil pressure of the first clutch driving circuit L1 may be disposed between the first buffer 38 and the first proportional valve 31.

Similarly, the second clutch driving circuit L2 may comprise a second driving hydraulic cylinder 111 and a second proportional valve 32. A second buffer 37 may be connected between to the second proportional valve 32 and the second driving hydraulic cylinder 111, respectively. A second oil pressure sensor 34 for detecting an oil pressure of the second clutch driving circuit L2 may be provided between the second buffer 37 and the second proportional valve 32.

In some embodiments, as shown in FIG. 2, the first proportional valve 31 may be connected to the first driving cylinder 151 and the oil container 16, respectively, and the second proportional valve 32 may be connected to the second driving cylinder 111 and the oil container 16, respectively. The piston of the first driving cylinder 151 may be connected to the driving part of the first clutch 6 to drive the first clutch 6 to engage or disengage. The piston of the second driving cylinder 111 may be connected to the driving part of the second clutch 3 to drive the second clutch 3 to engage or disengage.

The internal pump 18 is driven by the output shaft 9, and the external pump 20 may be driven by an external pump motor M. The inlets of the internal pump 18 and the external pump 20 are coupled to the oil container 16. In some embodiments, a first filter 17 is disposed between the oil container 16 and the inlets of the internal pump 18 and the external pump 20.

In some embodiments, the outlets of the internal pump 18 and the external pump 20 may be coupled to the first proportional valve 31 and the second proportional valve 32. In some embodiments, a second filter 27 may be disposed between the first and second proportional valves 31,32 and the outlets of the internal and external pumps 18, 20. The filtering precision of the second filter 27 is higher than that of the first filter 17, so that cleanliness of the hydraulic oil in the first proportional valve 31 and the second proportional valve 32 may be further improved.

The internal pump 18 and the external pump 20 may be connected in parallel, the first check valve 23 may be connected at the outlet side of the internal pump 18 in series, the second check valve 22 may be connected in series at the outlet side of the external pump 20, and the first check valve 23 and the internal pump 18 which are connected in series may be in parallel connection with the second check valve 22 and the external pump 20 which are connected in series between the oil container 16 and the first and second proportional valves 32 and 31.

In some embodiments, the hydraulic system 50 may further comprise a main oil pressure sensor 28 for detecting an oil pressure in a main oil line L of the hydraulic system 50 and an accumulator 29 which are connected to the line between the first and second check valves 23, 22 and the first and second proportional valves 32, 31.

In some embodiments, the hydraulic system 50 may further comprise a relief valve 21 in parallel connection with the first check valve 23 and the internal pump 18 which are connected in series as well as the second check valve 22 and the external pump 20 which are connected in series. The relief valve 21 is used to overflow the hydraulic oil in the main oil line L into the oil container 16.

The hydraulic system 50 may further comprise a pressure regulating valve 26 in parallel connection with the internal pump 18 for supplying lubricating oils to the driving system such as the respective gear pairs, bearings of the transmission.

A fourth check valve 24 may be disposed between the pressure regulating valve 26 and the outlet of the internal pump 18 to prevent back suction to the pressure regulating valve 26 when the internal pump 18 reverses. The pressure regulating valve 26 may be connected in series to a first damper 25A. The hydraulic system 50 may further comprise a first lubricating oil line for providing the lubricating oil to the driving system such as respective gear pairs and bearings of the transmission. A second damper 25B may be disposed in the lubricating oil line. When the vehicle is started, the hydraulic oil may be supplied into the lubricating system via the lubricating oil line to lubricate respective gear pairs and bearings of the transmission.

In some embodiments, a third check valve 19 is in parallel connection with the external pump 18 to prevent sucking air when back suction is occurred in the internal pump 18 during vehicle reversing.

The operation of the hydraulic system 50 of the driving system according to embodiments of the present disclosure will be described below.

As shown in FIG. 2, after the hydraulic system 50 is started, the internal pump 18 and/or the external pump 20 may suck oil from the oil container 16 via the first filter 17. The hydraulic oil may flow into the main oil line L, then into one of the first clutch driving circuit L1 and the second clutch driving circuit L2, so as to drive one of the first hydraulic cylinder 151 and the second hydraulic cylinder 111.

For the purpose of briefness, the operation for driving the first hydraulic cylinder 151 will be described as an example. It may be understood that, the operation for driving the first hydraulic cylinder 151 may also be applied to the second clutch driving circuit L2.

The piston of the first hydraulic cylinder 151 may compress a return spring under the hydraulic oil pressure to push the driving part and driven part of the first clutch 6 to engage with each other, so that the power may be transmitted from the input shaft 2 to the output shaft 9 via the first clutch 6 and finally transmitted to the wheels W.

When the first clutch 6 is disengaged, the first clutch driving circuit L1 may be communicated to the oil container 16, the oil pressure in the first hydraulic cylinder 151 may be decreased quickly, and the piston of the first hydraulic cylinder 151 may move quickly under the pushing of the return spring, so that the hydraulic oil may flow into the oil container 16. Therefore, the driving part and the driven part of the first clutch 6 may be disengaged from each other, thus cutting off the power transmission between the input shaft 2 and the output shaft 9.

With the driving system 50 according to embodiments of the present disclosure, generally, the internal pump 18 may be adopted to supply the hydraulic oil. The internal pump 18 may be driven by the output shaft 9, and the first check valve 23 may only allow the hydraulic oil to flow from the internal pump 18 into the first and second clutch driving circuits L1 and L2, thus preventing the oil pressure in the hydraulic system from impacting the operation of the internal pump 18 and preventing the hydraulic oil in the hydraulic system from reversely flowing.

In some embodiments, the third check valve 19 may only allow the hydraulic oil to flow from the oil container 16 toward the outlet side of the internal pump 18, thus preventing air suction during the back suction of the internal pump 18. For example, when the vehicle is reversed, the internal pump 18 may reversely rotate, and then the outlet of the internal pump 18 may suck oil from the oil container 16 via the third check valve 19, thus avoiding damage to the internal pump 18. In other words, an oil loop may be formed between the third check valve 19 and the internal pump 18 to avoid the air suction of the internal pump 18.

The fourth check valve 24 may only allow the hydraulic oil to flow from the internal pump 18 toward the pressure regulating valve 26 to prevent the reverse flowing of the oil for lubricating.

In some embodiments, if the oil pressure in the internal pump 18 is too low, the external motor M may be started to drive the external pump 20 which supplies oil to the main oil line L of the hydraulic system 50. The second check valve 22 may only allow the hydraulic oil to flow from the external pump 20 into the first and second clutch driving circuits L1 and L2, to prevent the oil pressure in the hydraulic system from impacting the operation of the external pump 20 and the hydraulic oil in the hydraulic system 50 from reversely flowing.

The internal pump 18 may supply the hydraulic oil when the hydraulic system 50 lacks the hydraulic oil, and the remaining oil in the internal pump 18 may be used as the lubricating oil or flow into the oil container 16. By provision of the accumulator 29, the external pump 20 may work intermittently, and the relief valve 21 may have a relieving function.

In the aforementioned hydraulic system, the pressure regulating valve 26 may supply the lubricating oil to the lubricating system of the vehicle.

In some embodiments, the hydraulic oil may be provided by the external pump 20 driven by the external motor M and the internal pump 18 driven by the input shaft 2. By means of the external pump 20, the external pump 20 may supply oil to the first clutch 6 to engage the first clutch 6 before the electric vehicle is started, thus realizing starting with zero rotational speed, having no idle condition, reducing the energy consumption of the electric vehicle, and improving the utilization rate of the electric power.

As described above, the accumulator 29 may be used for storing energy, and the pressure regulating valve 26 may be used for regulating the pressure of the hydraulic oil. When the electric vehicle stops and the internal pump 18 does not run, the pressure regulating valve 26 is closed. When the electric vehicle is started, the amount of the hydraulic oil in the internal pump 18 is slowly increased. After the hydraulic oil is dampened by the first damper 25A and the second damper 25B and the possible slight leakage inside the pressure regulating valve 26 may be compensated, so that the pressure in the main oil line L may be increased in a short time. When the electric vehicle is running, after the pressure in the main oil line L is increased, the amount of the oil for lubricating is gradually supplied. After the pressure in the main oil line L is increased to a predetermined value, the hydraulic oil may flow into the inlet of the internal pump 18, thus reducing the work load of the first filter 17.

When the vehicle is running, the excessive energy may be stored in the accumulator 29. The stored energy may be utilized to perform the gear shifting operation so as to improve the efficiency of the transmission.

With the driving system of the electric vehicle according to embodiments of the present disclosure, both the first clutch 6 and the second clutch 3 are controlled by the hydraulic system 50, and the first clutch 6 may be engaged before the vehicle is started, so that there is no the idling of the driving motor 1 after the vehicle is started. Only if the driving motor 1 starts to run, the power may be transmitted to the transmission 40, thus realizing the starting with zero rotational speed. As a result, the electric power loss may be reduced and the utilization rate of the electric power may be improved. Moreover, when the hydraulic oil supplied by the internal pump 18 is not enough, the external pump 20 may be used for supplement the hydraulic oil, thus improving the performance of the electric vehicle.

Therefore, with the driving system according to embodiments of the present disclosure, the starting with zero rotational speed may be realized. According to the pedaling degree and vehicle velocity change, the gear may be automatically switched, which may appropriately match the torque and speed characteristics of the driving motor to effectively improve the efficiencies of the driving motor under different driving conditions. The efficiencies of the driving motor may be optimized under different driving conditions to reduce energy consumption and increase the cruising range of the electric vehicle. For example, the driving system is especially suitable for an electric bus, which may need frequent acceleration, deceleration, stopping and starting.

According to embodiments of the present disclosure, an electric vehicle comprising the driving system 100 as described hereinabove may be provided.

The operation of the driving system according to embodiments of the present disclosure will be described with reference to FIG. 1. It would be appreciated by any person skilled in the art that, the transmission 40 in the driving system 100 according to embodiments of the present disclosure may comprise more than two transmission units.

Firstly, the parking gear of the driving system according to an embodiment of the present disclosure will be described with reference to FIG. 1. When the electric vehicle is in a parking state, the driving part of the first clutch 6 is disengaged from the driven part thereof, and the driving part of the second clutch 3 is disengaged from the driven part thereof, that is, the two clutches are disengaged and the power transmission from the driving motor 1 to the output shaft 9 is cut off.

Then, the first forward gear of the driving system according to an embodiment of the present disclosure will be described with reference to FIG. 1. When the electric vehicle is in a starting state or is running at a low speed, a shifting control system may disengage the second clutch 3 via a shifting mechanism, and engage the driving part and the driven part of the first clutch 6. Therefore, the power transmission path of the first forward gear may be as follows: the driving motor 1→the input shaft 2→the first clutch 6→the first gear 5→the second gear 7→the output shaft 9. At this time, the rotational speed of the driving motor 1 may be lowest, the output torque may be the highest, the transmission ratio may be the highest, and the power transmitted to the wheels may be the largest.

The shifting control system and the shifting mechanism are well known to a person skilled in the art, so that the detailed description thereof is omitted here.

Next, the second forward gear of the driving system according to embodiments of the present disclosure will be described with reference to FIG. 1. When the electric vehicle is running at an intermediate speed, the shifting control system may disengage the first clutch 6 via the shifting mechanism, and engage the driving part and the driven part of the second clutch 3. For example, when the first forward gear is shifted to the second forward gear, the shifting control system may sense the current driving state of the electric vehicle via corresponding sensors, so that the gear to which the electric vehicle will be shift may be determined. When the first clutch 6 is disengaged, the second clutch 3 is engaged, so as to achieve gear shifting. The power transmission path of the second forward gear may be as follows: the driving motor 1→the input shaft 2→the second clutch 3→the third gear 4→the fourth gear 8→the output shaft 9. At this time, the higher the transmission ratio, the lower the efficiency of the driving motor 1 is. Compared with the first forward gear, the transmission ratio of the second forward gear may be lower, the efficiency of the driving motor 1 and the energy utilization rate may be higher.

Finally, the reverse gear of the driving system according to embodiments of the present disclosure will be described with reference to FIG. 1. When the electric vehicle is reversed, the shifting control system may disengage the second clutch 3 via the shifting mechanism, and engage the driving part and the driven part of the first clutch 6. Certainly, the driving motor 1 may reversely rotate during reversing of the electric vehicle. The power transmission path of the reverse gear may be as follows: the driving motor 1→the input shaft 2→the first clutch 6→the first gear 5→the second gear 7→the output gear 9.

According to embodiments of the present disclosure, the driving system of the electric vehicle may comprise at least two transmission units, which may meet various complicated driving conditions. Therefore, the energy may be saved, and the driving system of the electric vehicle may have simplified structure.

In aforementioned embodiments, the transmission may provide two forward gears and a reverse gear, which may not only meet the requirement for high output torque when the vehicle is starting or climbing, but also meet the requirement for maximum output speed when the vehicle is running on a smooth road. The output torque needs to be quite high when the vehicle is started, climbing or accelerating. Therefore, the gear of the transmission may be shifted to a low speed gear, i.e. the first forward gear. Because the transmission ratio in the low speed gear is quite high, the torque transmitted to the wheels is quite high. When the electric vehicle is running at a high speed on the smooth road, the gear of the transmission may be shifted to a high speed gear, i.e. the second forward gear in this embodiment. At this time, the transmission ratio of the transmission is quite low so that the torque transmitted to the wheels is low, but the rotational speed of the wheels may be increased to the largest. Meanwhile, the gear shifting may be appropriately controlled by the shifting control system, the torque and speed characteristics of the driving motor may be matched ideally, and the efficiencies of the driving motor under different driving conditions may be optimized, thus saving the energy and increasing the cruising range of the electric vehicles.

According to embodiments of the present disclosure, the two forward gears of the transmission may be independent from each other and the gear shifting may be realized by controlling the disengaging or engaging of the driving part and the driven part of each clutch. Furthermore, the gear shifting may be reasonably controlled via the shifting control system so as to avoid the power interruption during the gear shifting. Therefore, the speed deceleration of the vehicle may not be perceived during gear shifting. Compared with the conventional automotive transmission, the structure of the transmission in the driving system according to embodiments of the present disclosure is simplified.

In some embodiments, before the electric vehicle is started, the external pump in the driving system may drive the first clutch to shift the vehicle to the first forward gear, and then control the starting of the driving motor to achieve starting of the electric vehicle with zero rotational speed.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A driving system for an electric vehicle, comprising:
   a driving motor;
   a transmission including,
      an input shaft connected to the driving motor,
      an output shaft,
      a first transmission unit having a first transmission ratio and connected to the input shaft and the output shaft, respectively, to transmit first power therebetween,
      a first clutch disposed on the input shaft and connected to the first transmission unit, for connecting and disconnecting the first power transmission between the input shaft and the first transmission unit,
      a second transmission unit having a second transmission ratio smaller than the first transmission ratio and connected to the input shaft and the output shaft, respectively, to transmit second power therebetween,
      a second clutch disposed on the input shaft and connected to the second transmission unit, for connecting and disconnecting the second power transmission between the input shaft and the second transmission unit; and
   a hydraulic system connected to the first clutch and the second clutch, respectively, for engaging/disengaging the first clutch to/from the first transmission unit and for engaging/disengaging the second clutch to/from the second transmission unit, respectively, wherein the hydraulic system comprises:
   an oil container;
   a first clutch driving circuit including a first driving hydraulic cylinder having a piston connected to a driving part of the first clutch, and a first proportional valve connected to the first driving hydraulic cylinder and the oil container, respectively;
   a second clutch driving circuit in parallel connection with the first clutch driving circuit, and including a second driving hydraulic cylinder having a piston connected to a driving part of the second clutch, and a second proportional valve connected to the second driving hydraulic cylinder and the oil container, respectively;
   an internal pump driven by the output shaft and having an inlet coupled to the oil container, and an outlet coupled to the first and second proportional valve respectively;
   a first check valve connected in series to the outlet of the internal pump;

an external pump driven by an external pump motor and having an inlet coupled to the oil container and an outlet coupled to the first and second proportional valve respectively;

a second check valve connected in series to the outlet of the external pump, wherein the first check valve and the internal pump which are connected in series, and the second check valve and the external pump which are connected in series, are connected in parallel between the oil container and the first clutch driving circuit as well as the second clutch driving circuit; and a third check valve connected in parallel with the external pump.

2. The driving system according to claim 1, wherein the first transmission unit comprises a first gear disposed on the input shaft, and a second gear disposed on the output shaft and engaged with the first gear, wherein the first gear is rotatably engaged with the input shaft, and the second gear is fixed onto the output shaft, and wherein a driving part of the first clutch is fixed onto the input shaft, and a driven part of the first clutch is connected to the first gear.

3. The driving system according to claim 2, wherein the first gear and the second gear are configured as cylindrical gear.

4. The driving system according to claim 1, wherein the first clutch driving circuit further comprises a first buffer connected to the first proportional valve and the first driving hydraulic cylinder, respectively; and wherein the second clutch driving circuit further comprises a second buffer connected to the second proportional valve and the second driving hydraulic cylinder, respectively.

5. The driving system according to claim 4, wherein the hydraulic system further comprises:

a first oil pressure sensor disposed between the first buffer and the first proportional valve, for detecting an oil pressure of the first clutch driving circuit;

a second oil pressure sensor disposed between the second buffer and the second proportional valve, for detecting an oil pressure of the second clutch driving circuit.

6. The driving system according to claim 1, wherein the second transmission unit comprises a third gear disposed on the input shaft, and a fourth gear disposed on the output shaft and engaged with the third gear, wherein the third gear is rotatably engaged with the input shaft, and the fourth gear is fixed onto the output shaft, and wherein a driving part of the second clutch is fixed onto the input shaft, and a driven part of the second clutch is connected to the third gear.

7. The driving system according to claim 1, wherein the hydraulic system further comprises:

a first filter connected to the oil container and the inlets of the internal and external pumps, respectively; and a second filter connected to the first and second check valves and the first and second proportional valves, respectively.

8. The driving system according to claim 1, wherein the hydraulic system further comprises:

a relief valve connected in parallel with the first check valve and the internal pump which are connected in series as well as the second check valve and the external pump which are connected in series.

9. The driving system according to claim 1, wherein the hydraulic system further comprises:

an accumulator connected to the first and second check valves and the first and second proportional valves, respectively.

10. The driving system according to claim 9, wherein the hydraulic system further comprises a main oil pressure sensor for detecting an oil pressure of a main oil line of the hydraulic system.

11. The driving system according to claim 10, wherein the hydraulic system further comprises:

a first damper connected in series to a pressure regulating valve;

a lubricating oil line connected to a fourth check valve and the pressure regulating valve, respectively; and a second damper disposed in the lubricating oil line.

12. The driving system according to claim 1, wherein the hydraulic system further comprises:

a pressure regulating valve connected to the internal pump in parallel for providing lubricating oil to the driving system; and a fourth check valve connected to the pressure regulating valve and the outlet of the internal pump, respectively.

13. The driving system according to claim 1, the first proportional valve is a two-position three-way solenoid valve.

14. An electric vehicle, comprising a driving system according to claim 1.

* * * * *